US011955010B2

(12) United States Patent
Bush et al.

(10) Patent No.: US 11,955,010 B2
(45) Date of Patent: Apr. 9, 2024

(54) SYSTEM AND METHOD FOR PROVIDING SITUATIONAL AWARENESS INTERFACES FOR AUTONOMOUS VEHICLE OPERATORS (71) Applicant: GM GLOBAL TECHNOLOGY OPERATIONS LLC, Detroit, MI (US)

(72) Inventors: Lawrence A Bush, Shelby Township, MI (US); Roy J Mathieu, Rochester Hills, MI (US); Joseph F Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 418 days.

(21) Appl. No.: 17/445,079

(22) Filed: Aug. 13, 2021

(65) Prior Publication Data
US 2023/0049499 A1 Feb. 16, 2023

(51) Int. Cl.
*G08G 1/00* (2006.01)
*G05D 1/00* (2024.01)
*G06F 3/04817* (2022.01)
*G07C 5/00* (2006.01)

(52) U.S. Cl.
CPC ............ *G08G 1/20* (2013.01); *G05D 1/0027* (2013.01); *G05D 1/0044* (2013.01); *G06F 3/04817* (2013.01); *G07C 5/006* (2013.01); *G07C 5/008* (2013.01)

(58) Field of Classification Search
CPC ........ G08G 1/20; G08G 1/202; G05D 1/0027; G05D 1/0044; G06F 3/04817; G07C 5/006; G07C 5/008; G06Q 10/063; G06Q 50/30; H04W 4/021; H04W 4/029; H04W 4/44
See application file for complete search history.

(56) References Cited

U.S. PATENT DOCUMENTS

| 11,181,905 B2* | 11/2021 | Alalao ................. H04W 4/38 |
| 2016/0093119 A1* | 3/2016 | Ahn ...................... G07C 5/006 701/29.3 |
| 2019/0179320 A1* | 6/2019 | Pacala ................. G05D 1/0214 |
| 2020/0317216 A1* | 10/2020 | Konrardy ............ B60W 30/182 |
| 2021/0380126 A1* | 12/2021 | Liu ...................... B60W 60/001 |
| 2022/0005140 A1* | 1/2022 | Beaurepaire ........ G06F 3/04847 |

* cited by examiner

*Primary Examiner* — Anshul Sood
*Assistant Examiner* — Micah Chuen-Him Cheng
(74) *Attorney, Agent, or Firm* — Lorenz & Kopf LLP (57) ABSTRACT

A supervisory control system is disclosed that provides an operator situational awareness interface use with monitoring a plurality of automated vehicles (AVs). The system is configured to: generate a map of a geographical area of interest; obtain location data and perceived risk data for a plurality of AVs in the geographical area; generate a vehicle icon corresponding to each AV; position the vehicle icon for each AV on the map based on the location data for a corresponding AV; apply a color coding to each vehicle icon based on a perceived risk level for a corresponding AV; and signal a display device to display an AV fleet map graphic that includes the color coded vehicle icons positioned on the map. The controller may be further configured to: generate an AV servicing queue graphic that displays vehicle icons in an order based on a determined servicing priority.

19 Claims, 6 Drawing Sheets

SYSTEM AND METHOD FOR PROVIDING SITUATIONAL AWARENESS INTERFACES FOR AUTONOMOUS VEHICLE OPERATORS

TECHNICAL FIELD

The technology described in this patent document relates generally to situational awareness interfaces for fleet vehicle operators and more particularly to providing an operator situational awareness interface for use by operators to monitor a fleet of automated vehicles.

Autonomous vehicles including fully autonomous vehicles may not be 100% autonomous and may require intermittent/periodic intervention from a trained operator. A user interface is needed to achieve efficient management of operator-to-vehicle assignment for a fleet of vehicles including a fleet of autonomous or automated vehicles.

Accordingly, it is desirable to provide an operator situational awareness interface for operators to use to monitor automated vehicles. Furthermore, other desirable features and characteristics will become apparent from the subsequent detailed description and the appended claims, taken in conjunction with the accompanying drawings.

SUMMARY

Systems and methods for providing an operator situational awareness interface are provided. In one embodiment, provided is a supervisory control system for providing an operator situational awareness interface for a plurality of operators to monitor a plurality of automated vehicles (AVs). The system includes a controller configured to: generate a map of a geographical area of interest; obtain location data and perceived risk data for a plurality of AVs in the geographical area; generate a vehicle icon corresponding to each AV of the plurality of AVs; position the vehicle icon for each AV on the map based on the location data for the corresponding AV; apply a color coding to each vehicle icon based on a perceived risk level for the corresponding AV; and signal a display device to display an AV fleet map graphic that includes the map with color coded vehicle icons positioned thereon. The AVs may include fully autonomous vehicles, semi-autonomous vehicles, and/or passenger-driven vehicles with automated driving features.

In one embodiment, to obtain location data and perceived risk data, the controller is configured to retrieve the location data and perceived risk data from a data integration module.

In one embodiment, the data integration module is configured to accumulate the location data and perceived risk data from the plurality of AVs.

In one embodiment, the controller is further configured to assign a risk-level-specific color to each vehicle icon based on the perceived risk data for the corresponding vehicle.

In one embodiment, the controller is further configured to determine a perceived risk level for each AV based on the perceived risk data.

In one embodiment, the controller is further configured to assign one of a plurality of predetermined perceived risk levels to each AV based on the perceived risk data.

In one embodiment, the controller is further configured to assign a risk-level-specific color to each vehicle icon based on the perceived risk level assigned to the corresponding AV.

In one embodiment, the controller is further configured to: generate an AV servicing queue graphic that displays vehicle icons for the AVs in an order based on a determined servicing priority; and signal the display device to display the AV servicing queue graphic.

In one embodiment, to generate an AV servicing queue graphic, the controller is further configured: determine a perceived risk level for each of the plurality of AVs based on the perceived risk data; identify, based on the perceived risk levels, the AVs in need of servicing assistance; determine a servicing assistance prioritization order for the AVs in need of servicing assistance based on the perceived risk levels of the AVs in need of servicing assistance; generate a vehicle icon corresponding to each of the AVs in need of servicing assistance; apply a color coding to each vehicle icon for the AVs in need of servicing assistance based on a perceived risk for the corresponding vehicle; and position the vehicle icons for the AVs in need of servicing assistance on the AV servicing queue graphic in the determined servicing assistance prioritization order.

In one embodiment, the controller is further configured to: generate and position a prioritization order graphical element that indicates a servicing priority order on the AV servicing queue graphic; and generate and position, on the AV servicing graphic, a plurality of operator icons that are representative of operators who can assist with servicing the needs of the AVs.

In one embodiment, the controller is further configured to: generate and position on the AV servicing queue graphic an operator assignment graphical element for use in identifying which of the AVs in need of servicing assistance has been assigned to a particular operator; and indicate the assignment of an AV to a particular operator by positioning the vehicle icon for the assigned AV on the operator assignment graphical element for the particular operator.

In one embodiment, the controller is further configured to: generate and position on the AV servicing queue graphic a special servicing need graphical element for use in identifying AVs that have a special servicing need and to identify an operator who may be best suited to service the special servicing need; generate and position on the AV servicing queue graphic a special operator assignment graphical element for use in identifying which of the AVs with a special servicing need has been assigned to the operator who is best suited to service the special servicing need; and indicate the assignment of an AV with a special servicing need to the operator who is best suited to service the special servicing need by positioning the vehicle icon for the assigned special servicing need AV on the special operator assignment graphical element.

In another embodiment, a method in a supervisory control system for providing an operator situational awareness interface for a plurality of operators to monitor a plurality of automated vehicles (AVs) is provided. The method includes: generating a map of a geographical area of interest; obtaining location data and perceived risk data for a plurality of AVs in the geographical area; generating a vehicle icon corresponding to each AV of the plurality of AVs; positioning the vehicle icon for each AV on the map based on the location data for the corresponding AV; applying a color coding to each vehicle icon based on a perceived risk level for the corresponding AV; and signaling a display device to display an AV fleet map graphic that includes the map with color coded vehicle icons positioned thereon. The AVs may include fully autonomous vehicles, semi-autonomous vehicles, and/or passenger-driven vehicles with automated driving features.

In one embodiment, obtaining location data and perceived risk data includes retrieving the location data and perceived risk data from a data integration module.

In one embodiment, the data integration module is configured to accumulate the location data and perceived risk data from the plurality of AVs.

In one embodiment, the method further includes assigning a risk-level-specific color to each vehicle icon based on the perceived risk data for the corresponding vehicle.

In one embodiment, the method further includes determining a perceived risk level for each AV based on the perceived risk data.

In one embodiment, the method further includes assigning one of a plurality of predetermined perceived risk levels to each AV based on the perceived risk data.

In one embodiment, the method further includes assigning a risk-level-specific color to each vehicle icon based on the perceived risk level assigned to the corresponding AV.

In one embodiment, the method further includes: generating an AV servicing queue graphic that displays vehicle icons for the AVs in an order based on a determined servicing priority; and signaling the display device to display the AV servicing queue graphic.

In one embodiment, the generating an AV servicing queue graphic includes: determining a perceived risk level for each of the plurality of AVs based on the perceived risk data; identifying, based on the perceived risk levels, the AVs in need of servicing assistance; determining a servicing assistance prioritization order for the AVs in need of servicing assistance based on the perceived risk levels of the AVs in need of servicing assistance; generating a vehicle icon corresponding to each of the AVs in need of servicing assistance; applying a color coding to each vehicle icon for the AVs in need of servicing assistance based on a perceived risk for the corresponding vehicle; and positioning the vehicle icons for the AVs in need of servicing assistance on the AV servicing queue graphic in the determined servicing assistance prioritization order.

In one embodiment, the method further includes: generating and positioning a prioritization order graphical element that indicates a servicing priority order on the AV servicing queue graphic; and generating and positioning, on the AV servicing graphic, a plurality of operator icons that are representative of operators who can assist with servicing the needs of the AVs.

In one embodiment, the method further includes: generating and positioning on the AV servicing queue graphic an operator assignment graphical element for use in identifying which of the AVs in need of servicing assistance has been assigned to a particular operator; and indicating the assignment of an AV to a particular operator by positioning the vehicle icon for the assigned AV on the operator assignment graphical element for the particular operator.

In one embodiment, the method further includes: generating and positioning on the AV servicing queue graphic a special servicing need graphical element for use in identifying AVs that have a special servicing need and to identify an operator who may be best suited to service the special servicing need; generating and positioning on the AV servicing queue graphic a special operator assignment graphical element for use in identifying which of the AVs with a special servicing need has been assigned to the operator who is best suited to service the special servicing need; and indicating the assignment of an AV with a special servicing need to the operator who is best suited to service the special servicing need by positioning the vehicle icon for the assigned special servicing need AV on the special operator assignment graphical element.

In another embodiment, provided is a non-transitory computer readable media encoded with programming instructions configurable to cause one or more processors in a supervisory control system to perform a method of providing an operator situational awareness interface for a plurality of operators to monitor a plurality of automated vehicles (AVs). The method includes: generating a map of a geographical area of interest; obtaining location data and perceived risk data for a plurality of AVs in the geographical area; generating a vehicle icon corresponding to each AV of the plurality of AVs; positioning the vehicle icon for each AV on the map based on the location data for the corresponding AV; applying a color coding to each vehicle icon based on a perceived risk level for the corresponding AV; and signaling a display device to display an AV fleet map graphic that includes the map with color coded vehicle icons positioned thereon. The AVs may include fully autonomous vehicles, semi-autonomous vehicles, and/or passenger-driven vehicles with automated driving features.

In one embodiment, obtaining location data and perceived risk data includes retrieving the location data and perceived risk data from a data integration module.

In one embodiment, the data integration module is configured to accumulate the location data and perceived risk data from the plurality of AVs.

In one embodiment, the method further includes assigning a risk-level-specific color to each vehicle icon based on the perceived risk data for the corresponding vehicle.

In one embodiment, the method further includes determining a perceived risk level for each AV based on the perceived risk data.

In one embodiment, the method further includes assigning one of a plurality of predetermined perceived risk levels to each AV based on the perceived risk data.

In one embodiment, the method further includes assigning a risk-level-specific color to each vehicle icon based on the perceived risk level assigned to the corresponding AV.

In one embodiment, the method further includes: generating an AV servicing queue graphic that displays vehicle icons for the AVs in an order based on a determined servicing priority; and signaling the display device to display the AV servicing queue graphic.

In one embodiment, the generating an AV servicing queue graphic includes: determining a perceived risk level for each of the plurality of AVs based on the perceived risk data; identifying, based on the perceived risk levels, the AVs in need of servicing assistance; determining a servicing assistance prioritization order for the AVs in need of servicing assistance based on the perceived risk levels of the AVs in need of servicing assistance; generating a vehicle icon corresponding to each of the AVs in need of servicing assistance; applying a color coding to each vehicle icon for the AVs in need of servicing assistance based on a perceived risk for the corresponding vehicle; and positioning the vehicle icons for the AVs in need of servicing assistance on the AV servicing queue graphic in the determined servicing assistance prioritization order.

In one embodiment, the method further includes: generating and positioning a prioritization order graphical element that indicates a servicing priority order on the AV servicing queue graphic; and generating and positioning, on the AV servicing graphic, a plurality of operator icons that are representative of operators who can assist with servicing the needs of the AVs.

In one embodiment, the method further includes: generating and positioning on the AV servicing queue graphic an operator assignment graphical element for use in identifying which of the AVs in need of servicing assistance has been assigned to a particular operator; and indicating the assignment of an AV to a particular operator by positioning the vehicle icon for the assigned AV on the operator assignment graphical element for the particular operator.

In one embodiment, the method further includes: generating and positioning on the AV servicing queue graphic a special servicing need graphical element for use in identifying AVs that have a special servicing need and to identify an operator who may be best suited to service the special servicing need; generating and positioning on the AV servicing queue graphic a special operator assignment graphical element for use in identifying which of the AVs with a special servicing need has been assigned to the operator who is best suited to service the special servicing need; and indicating the assignment of an AV with a special servicing need to the operator who is best suited to service the special servicing need by positioning the vehicle icon for the assigned special servicing need AV on the special operator assignment graphical element.

In another embodiment, a supervisory control system for generating an AV servicing queue graphic for a plurality of operators monitoring a plurality of automated vehicles (AVs) is provided. The supervisory control system includes a controller configured to: obtain perceived risk data for a plurality of AVs; determine a perceived risk level for each of the plurality of AVs based on the perceived risk data; identify, based on the perceived risk levels, the AVs in need of servicing assistance; determine a servicing assistance prioritization order for the AVs in need of servicing assistance based on the perceived risk levels of the AVs in need of servicing assistance; generate a vehicle icon corresponding to each of the AVs in need of servicing assistance; apply a color coding to each vehicle icon for the AVs in need of servicing assistance based on a perceived risk for the corresponding vehicle; position the vehicle icons for the AVs in need of servicing assistance on the AV servicing queue graphic in the determined servicing assistance prioritization order; and signal a display device to display the AV servicing queue graphic. The AVs may include fully autonomous vehicles, semi-autonomous vehicles, and/or passenger-driven vehicles with automated driving features.

In another embodiment, a method for generating an AV servicing queue graphic for a plurality of operators monitoring a plurality of automated vehicles (AVs) is provided. The method includes: obtaining perceived risk data for a plurality of AVs; determining a perceived risk level for each of the plurality of AVs based on the perceived risk data; identifying, based on the perceived risk levels, the AVs in need of servicing assistance; determining a servicing assistance prioritization order for the AVs in need of servicing assistance based on the perceived risk levels of the AVs in need of servicing assistance; generating a vehicle icon corresponding to each of the AVs in need of servicing assistance; applying a color coding to each vehicle icon for the AVs in need of servicing assistance based on a perceived risk for the corresponding vehicle; positioning the vehicle icons for the AVs in need of servicing assistance on the AV servicing queue graphic in the determined servicing assistance prioritization order; and signaling a display device to display the AV servicing queue graphic. The AVs may include fully autonomous vehicles, semi-autonomous vehicles, and/or passenger-driven vehicles with automated driving features.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for enabling a plurality of remote operators in an operator pool to simultaneously monitor and control a large number of automated vehicles (AVs) in a fleet of automated vehicles. The AVs may include fully autonomous vehicles, semi-autonomous vehicles, and/or passenger-driven vehicles having automated driving features. An automated vehicle may be a passenger car, truck, sport utility vehicle, recreational vehicle, or some other type of land vehicle. The following disclosure provides an interface that enables assigning vehicles to operators in real time, wherein operators can take over control of the AVs in need of intervention. The following disclosure describes apparatus, systems, techniques, and articles for displaying vehicles in need of operator interaction. The following disclosure describes apparatus, systems, techniques, and articles for operator pooling management of a fleet of automated vehicles. The following disclosure describes apparatus, systems, techniques, and articles for AV to operator assignment. The following disclosure describes apparatus, systems, techniques, and articles for prioritizing vehicle servicing based on mission risk. The following disclosure describes apparatus, systems, techniques, and articles for providing a priority queue for prioritizing vehicle servicing based on mission risk. The following disclosure describes apparatus, systems, techniques, and articles for providing a user interface that displays which AV is next in line for servicing. The following disclosure describes apparatus, systems, techniques, and articles for color coding a display of vehicles for attentional urgency. The following disclosure describes apparatus, systems, techniques, and articles for providing awareness of vehicle likely to need help. The following disclosure describes apparatus, systems, techniques, and articles for providing a georeferenced urgency/risk display. The following disclosure describes apparatus, systems, techniques, and articles for color coding mapped vehicles to track and identify geographical trouble spots. The following disclosure describes apparatus, systems, techniques, and articles for assigning vehicle servicing prioritization based on area of operation. The following disclosure describes apparatus, systems, techniques, and articles for prioritizing vehicle assignment based on operator specialty. The following disclosure describes apparatus, systems, techniques, and articles for leapfrogging around default risk-based prioritization. The following disclosure describes apparatus, systems, techniques, and articles for displaying queuing analysis information.

Figure 1:
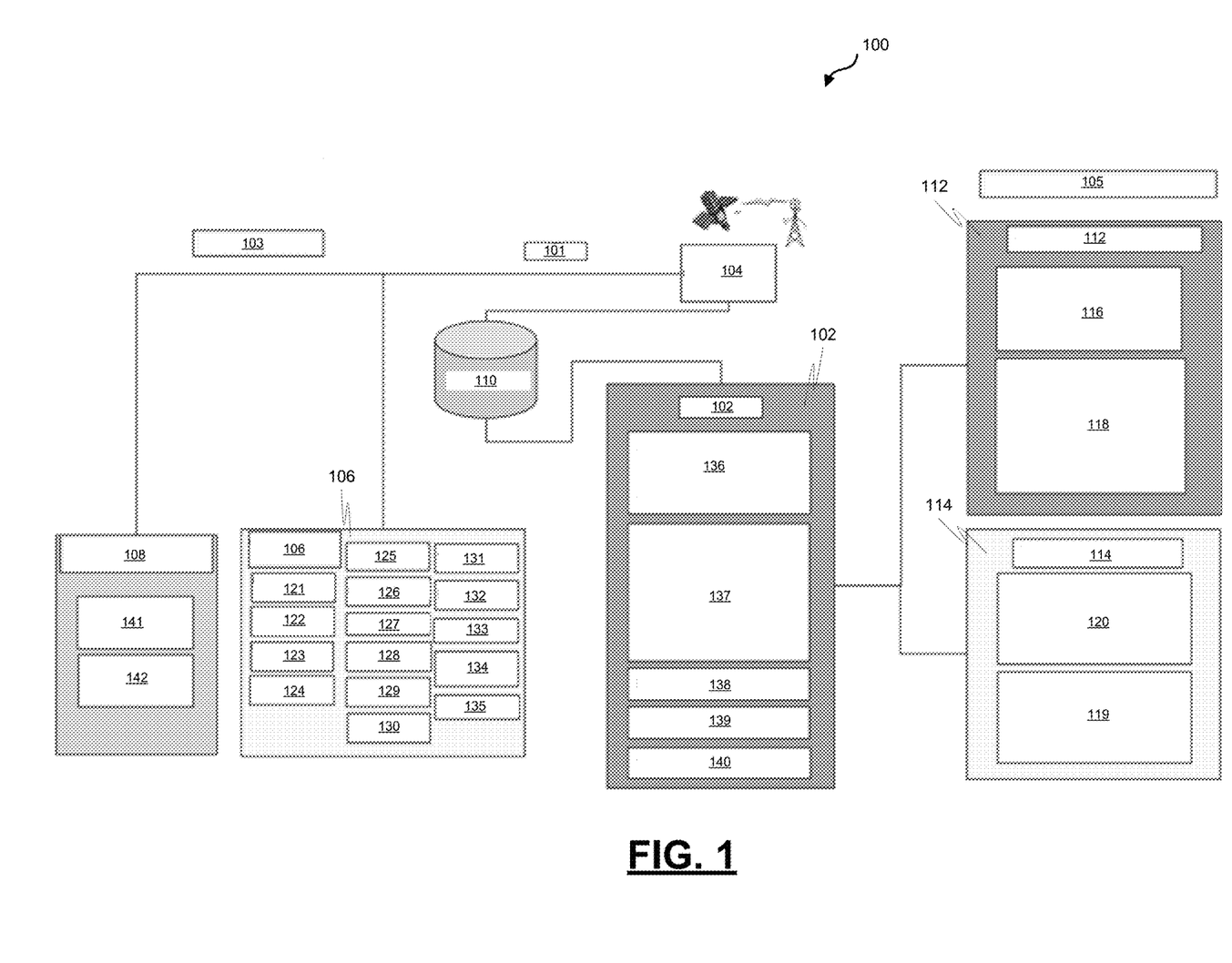
FIG. 1 is a block diagram depicting an example system component architecture for providing route and risk assessment recommendations for autonomous land travel and for enabling a plurality of remote operators in an operator pool to simultaneously monitor and control a large number of AVs in a fleet of AVs, in accordance with various embodiments.

FIG. 1 is a block diagram depicting an example system component architecture 100 for providing route and risk assessment recommendations for autonomous land travel and for enabling a plurality of remote operators in an operator pool to simultaneously monitor and control a large number of AVs in a fleet of AVs. The example system component architecture 100 includes a processing entity 102 that is connected by a data and communication network 104 to a plurality of automated vehicles and infrastructure (e.g., using V2X communication 101) in an environment in which the plurality of automated vehicles operate to allow the processing entity 102 to form a relational network with the plurality of automated vehicles and infrastructure to obtain data from system inputs 103 including on-board vehicle input sources 106 associated with the plurality of automated vehicles and data from off-board input sources 108 associated with the infrastructure. As used herein the term "relational network" refers to any network in which the various constituents of the network work together to accomplish a purpose.

The on-board vehicle input sources 106 for the automated vehicle include one or more of sensing devices that sense observable conditions of the exterior environment and/or the interior environment of a vehicle and generate sensor data relating thereto. The one or more sensing devices in this example include Personal Devices/Cameras 121 (e.g., cameras or video recording devices on smartphones, tablet computers, phablets, etc.), Personal Devices/Sensors 122 (e.g., sensors, such as GPS, Lidar and other sensors, on smartphones, tablet computers, phablets, etc.), Vehicle/Interior Motion Sensors 123, external/internal mics 124, LIDAR/Radar 125, External Cameras 126, Internal Cameras 127, Brake Sensor 128, Steering sensor 129, Throttle Sensor 130, Vehicle Switches 131, HMI Interactions 132, GPS 133, 6 DOF (degree of freedom) Accelerometers 134, and/or vehicle speed sensing devices 135. The on-board vehicle input sources 106 are used to collect observable data that may be used to create data components necessary to assess mission risk.

The off-board input sources 108 include one or more of sensing devices that sense observable conditions in an environment through which the plurality of automated vehicles may travel and generate data relating thereto. The generated data may include infrastructure sensor data 141 (e.g., inductive-loop traffic detectors, intersection monitoring systems, floating car data, etc.) and infrastructure camera data 142. The off-board input sources 108 may be coupled to infrastructure such as traffic lights, traffic signs, bridges, buildings, and other infrastructure items.

The example system component architecture 100 also includes a data integration module 110 for accumulating and storing the data obtained over the data and communication network 104 from the on-board vehicle input sources 106 and the off-board input sources 108, operation center interfaces 112 for operation center personnel, and vehicle interfaces 114 for AVs. The data integration module 110 includes processing hardware, software, and storage media for storing the data obtained over the data and communication network 104. The operation center interfaces 112 include a supervisory control interface 116 and a teleoperation interface 118 for controlling an AV. The vehicle interfaces 114 include a passenger information display 120 for a passenger in an AV and a remote override interface 119 for controlling the behavior and/or trajectory of an AV. The supervisory control interface 116 allows for remote monitoring of the vehicle operational movement using a supervisory interface display and controls. The teleoperation interface 118 allows for remote vehicle control of the steering, throttle, and braking of the vehicle.

The processing entity 102 includes at least one controller comprising at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and non-volatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. The programming instructions may include one or more separate programs, each of which comprises an ordered listing of executable instructions for implementing logical functions.

Via system outputs 105, the processing entity 102 is configured to enable a plurality of remote operators in an operator pool to simultaneously monitor and control a large number of AVs in a fleet of AVs via the operation center interfaces 112, which include the supervisory control interface 116 and the teleoperation interface 118. The example supervisory control interface 116 includes a display and controls. The example teleoperation interface 118 includes sensing, control inputs, steering, braking, and lag.

Via system outputs 105, the processing entity 102 is also configured to enhance passenger awareness in an AV and provide a control interface for a passenger in the AV via the vehicle interfaces 114, which include the passenger information display 120 and the remote override interface 119. The example passenger information display 120 provides a display of projected AV maneuvers and travel plan and a display of objects outside of the vehicle sensed by the vehicle. The example remote override interface 119 provides a passenger with a way to halt or change an AV behavior and/or trajectory.

The processing entity 102 is configured to: process traffic around an AV, generate a risk field around the AV, process a trajectory overlay, and determine a temporal urgency for operator intervention with the AV (operation 136). The processing entity 102 is configured to perform temporal risk prediction (operation 137). Temporal risk prediction may include considering: past, now, forecast risk prediction; mission type prior; vehicle type prior; location-time prior; behavior prior; traffic, weather; relative progress update; and bother risk. The processing entity 102 is configured to perform load balancing (operation 138) regarding assignment of AVs to operators in an operator pool. The processing entity 102 is configured to execute a handoff algorithm (operation 139) to determine when and to whom to handoff AV control to. The processing entity 102 is configured to execute a teleoperation algorithm (operation 140) to facilitate operator control of an AV. The teleoperation algorithm includes a process summary of commands to dynamically control the vehicle trajectory.

Figure 2:
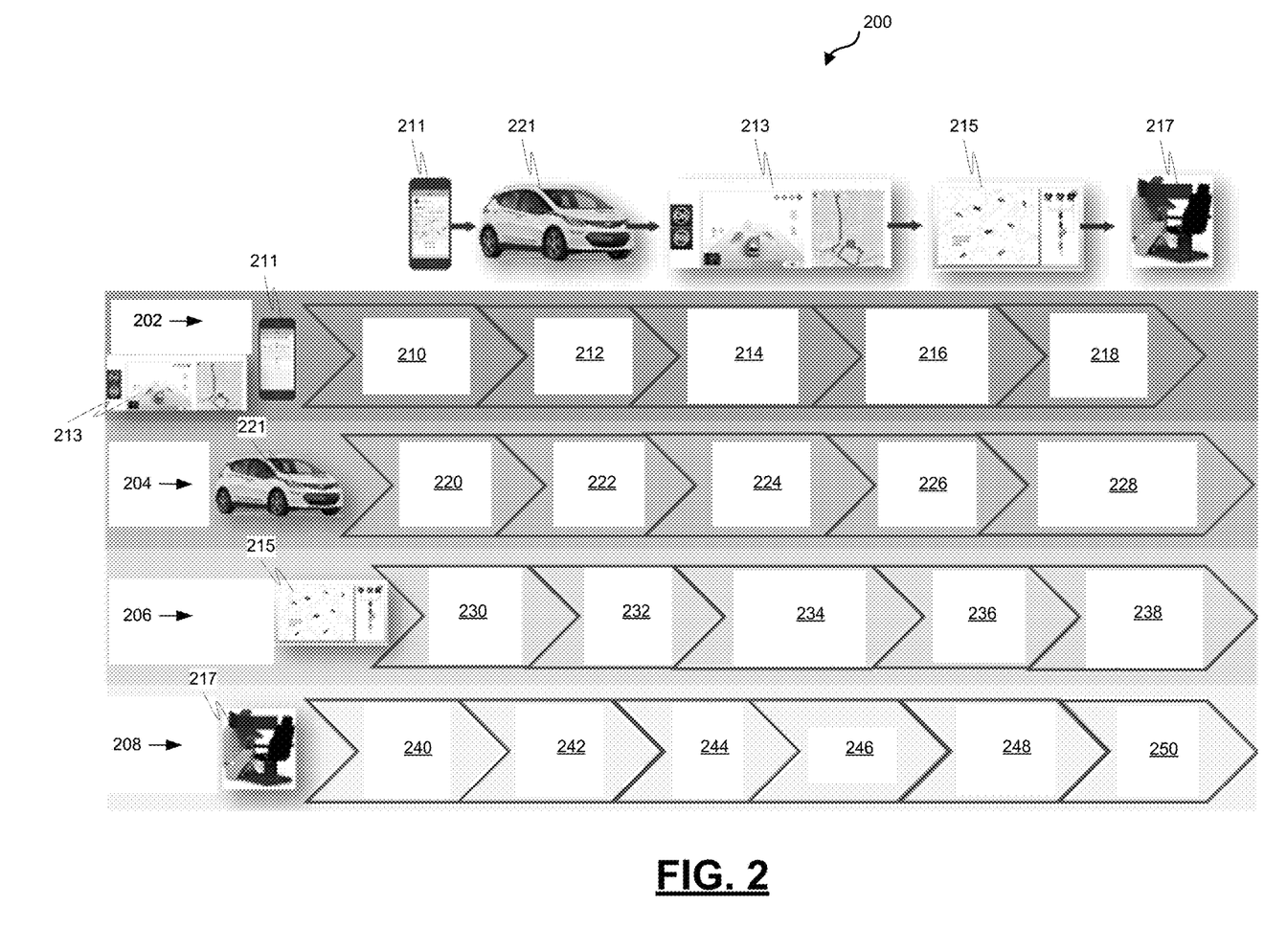
FIG. 2 is a process flow diagram depicting an example process in an example system component architecture for enabling a plurality of remote operators in an operator pool to simultaneously monitor and control a large number of AVs in a fleet of AVs and to enhance passenger awareness and provide a control interface for passengers in AVs, in accordance with various embodiments.

FIG. 2 is a process flow diagram depicting an example process 200 in an example system component architecture 100 for enabling a plurality of remote operators in an operator pool to simultaneously monitor and control a large number of AVs in a fleet of AVs and to enhance passenger awareness and provide a control interface for passengers in AVs. The example process includes a plurality of asynchronously executing subprocesses including an example passenger experience process 202 for passengers utilizing an AV in the fleet of AVs, an example vehicle decision cycle 204 for each AV in the fleet of AVs, an example supervisory control decision cycle 206 in the example supervisory control system, and an example operator process 208 for remote operators in the operator pool.

The example passenger experience process 202 includes a user (e.g., passenger) of an AV service such as an AV taxi service requesting a ride to a destination (operation 210). The request for a ride may be made through a user device 211 such as a tablet computer, a smartphone, phablet, laptop computer, notebook computer, or some other electronic device with user access. The request for a ride may be made to a central scheduling system for the fleet of AVs via a supervisory control system (e.g., the processing entity 102).

The example passenger experience process 202 includes user acceptance of an assigned route (operation 212) that is responsive to the request for a ride. The user acceptance may be made through the user device 211.

The example passenger experience process 202 includes observing a user situational awareness interface 213 (operation 214). The example user situational awareness interface 213 is generated by a supervisory control system (e.g., the processing entity 102) and provides the passenger in an AV with information to build trust in automation, understand and select routing options, identify risks, prepare for vehicle intent of maneuvers, and a way to procure assistance when necessary. The user situational awareness interface 213 may be provided for display on the user device 211 and/or a display device situated within the AV.

The example passenger experience process 202 includes a passenger requesting intervention (operation 216). A request for intervention may be made when a passenger detects the need for or has a specific desire for assistance from a remote operator for completing a ride.

The example passenger experience process 202 includes observing and confirming the outcome of the ride (operation 218). The passenger may confirm the outcome of the ride using the user device 211.

The example vehicle decision cycle 204 includes observing situation and need (operation 220). The example vehicle decision cycle 204 is performed by a processing component or controller in an AV 221 that has been dispatched (e.g., by the central scheduling system) to service the request for a ride.

The example vehicle decision cycle 204 includes publishing risk level (operation 222). The risk level for the AV 221 is determined by the AV 221 and published to the supervisory control system (e.g., the processing entity 102). The risk level captures and conveys the probability of mission failure (one minus the probability of mission success) which incorporates the likelihood of delays, the likelihood of needing assistance due to the complexities of the driving environment in the places to be traversed, due to the traffic congestion, due to the vehicle health and vehicle capabilities, plus the severity of the failure. The expected recovery time (or likelihood) from failure is also incorporated.

The example vehicle decision cycle 204 includes reassessing situation (operation 224) and updating risk level (operation 226) based on reassessment. The AV 221 continuously reassesses its situation during a trip.

The example vehicle decision cycle 204 further includes requesting operator interaction when imperative (operation 228). When through the reassessing its situation and updating its risk level the AV 221 determines that it needs operator intervention to complete a trip, the AV 221 requests operator interaction from the supervisory control system (e.g., the processing entity 102).

The example supervisory control decision cycle 206 is performed by a supervisory control system (e.g., the processing entity 102) and includes dispatching a ride request to the vehicle (e.g., AV 221) (operation 230). The ride request is dispatched responsive to a request for a ride.

The example supervisory control decision cycle 206 includes observing progress and risk level for the trip (operation 232) and analyzing interaction need characteristics (operation 234). The result from the observing and analyzing can result in the generation of an operator situational awareness interface 215 that provides a user interface that enables a plurality of remote operators to simultaneously monitor and control a greater number of automated vehicles.

The example supervisory control decision cycle 206 includes tracking operator loads (operation 236) and handing off vehicle assistance tasks to appropriate available operator (operation 238) when operator intervention is necessary.

The example operator process 208 includes accepting, by a remote operator, a task through an operator interface 217 (operation 240). The operator interface 217 includes a plurality of display devices for displaying the operator situational awareness interface 215 and for use by the operator when exercising control over an AV 221.

The example operator process 208 includes observing situation and need (operation 242). The operator may perform the observing by observing the operator situational awareness interface 215 on the operator interface 217. The example operator process 208 further includes the operator deciding a course of action (operation 244), executing the course of action (operation 246), observing and confirming the outcome (operation 248), and releasing control (operation 250) of an AV 221 after completing vehicle assistance.

Figure 3:
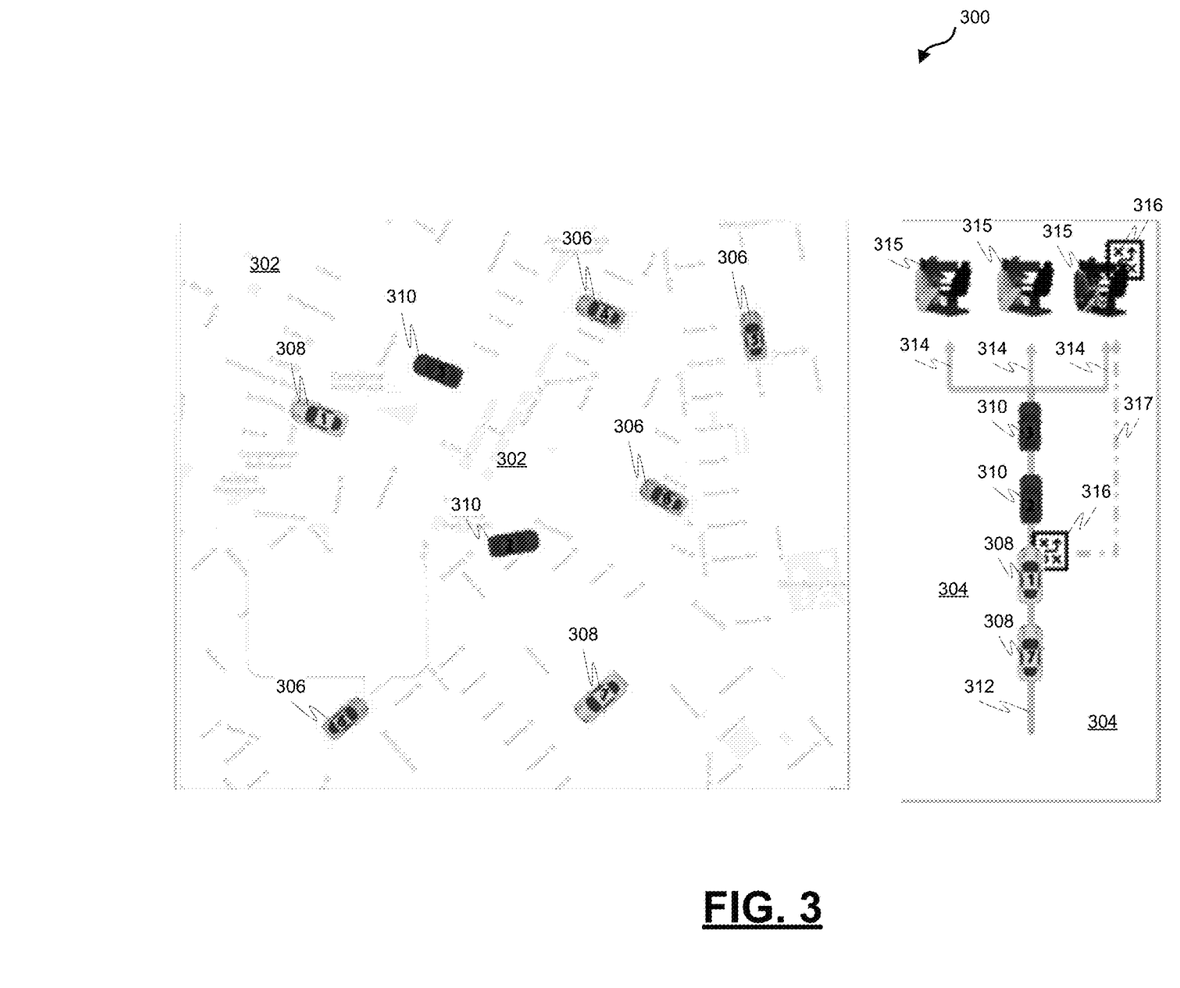
FIG. 3 is a diagram depicting an example operator situational awareness interface generated by a supervisory control system, in accordance with various embodiments.

FIG. 3 is a diagram depicting an example operator situational awareness interface 300 generated by a supervisory control system (e.g., the processing entity 102). The example operator situational awareness interface 300 includes an AV fleet map graphic 302 that provides a top down view of a geographical area and the location of AVs in a fleet of AVs that are located within the geographical area. The example operator situational awareness interface 300 also includes an AV servicing queue graphic 304 that displays the AVs depicted in the AV fleet map graphic 302 in an order based on a servicing priority determined by the supervisory control system.

To generate the example AV fleet map graphic 302, the supervisory control system is configured to generate a map of a geographical area of interest, obtain location data and perceived risk data for a plurality of AVs 306, 308, 310 in a fleet of AVs (e.g., the location data and perceived risk data may be obtained from the data integration module 110), generate a vehicle icon for each AV whose location data indicates that the AV is within the geographical area of interest, and position the vehicle icons on the map based on the location data for the corresponding vehicle.

The supervisory control system is further configured to apply a color coding to each vehicle icon, wherein each vehicle icon is assigned a risk-level-specific color based on the perceived risk data for the corresponding vehicle. As a result, the AV fleet map graphic 302 includes a plurality of color-coded AVs 306, 308, 310. In this example, the risk data for the AVs 306 indicate that the AVs 306 are at a first risk level, the risk data for the AVs 308 indicate that the AVs 308 are at a second risk level, and the risk data for the AVs 310 indicate that the AVs 310 are at a third risk level. Consequently, the supervisory control system, in this example, color-codes the AVs 306 that are at the first risk level with a first risk-level-specific color (e.g., green), color-codes the AVs 308 that are at the second risk level with a second risk-level-specific color (e.g., yellow), and color-codes the AVs 310 that are at the third risk level with a third risk-level-specific color (e.g., red).

To generate the example AV servicing queue graphic 304, the supervisory control system is configured to generate a prioritization order graphical element (e.g., line graphical element 312) that indicates a servicing priority order, position the prioritization order graphical element on the AV servicing queue graphic 304, generate operator icons 315 that are representative of operators who can assist with servicing the needs of the AVs, obtain perceived risk data for the plurality of AVs 306, 308, 310 in the fleet of AVs (e.g., the perceived risk data may be obtained from the data integration module 110) that are included in the AV fleet map graphic 302, determine a risk level for each of the plurality of AVs 306, 308, 310, identify based on risk level the AVs 308, 310 in need of servicing assistance, determine a servicing assistance prioritization order for the AVs 308, 310 in need of servicing assistance based on the risk level of the AVs 308, 310 in need of servicing assistance, apply a color coding to each vehicle icon for the AVs 308, 310 in need of servicing assistance, and position the icons 308, 310 for the AVs in need of servicing assistance on the AV servicing queue graphic 304 in the determined servicing assistance prioritization order.

The example AV servicing queue graphic 304 also includes an operator assignment graphical element 314 for use in identifying which of the AVs 308, 310 in need of servicing assistance has been assigned to a particular operator. When an AV is assigned to a particular operator, the icon for the AV can be placed on the operator assignment graphical element 314 for the particular operator.

The example AV servicing queue graphic 304 also includes a special servicing need graphical element 316 for use in identifying AVs that have a special servicing need and to identify the operator who may be best suited to service the special servicing need. The AV servicing queue graphic 304 also includes a special operator assignment graphical element 317 for use in identifying which of the AVs with a special servicing need has been assigned to the operator who is best suited to service the special servicing need. When an AV with a special servicing need is assigned to the operator who is best suited to service the special servicing need, the icon for the AV can be placed on the special operator assignment graphical element 317.

Figure 4A:
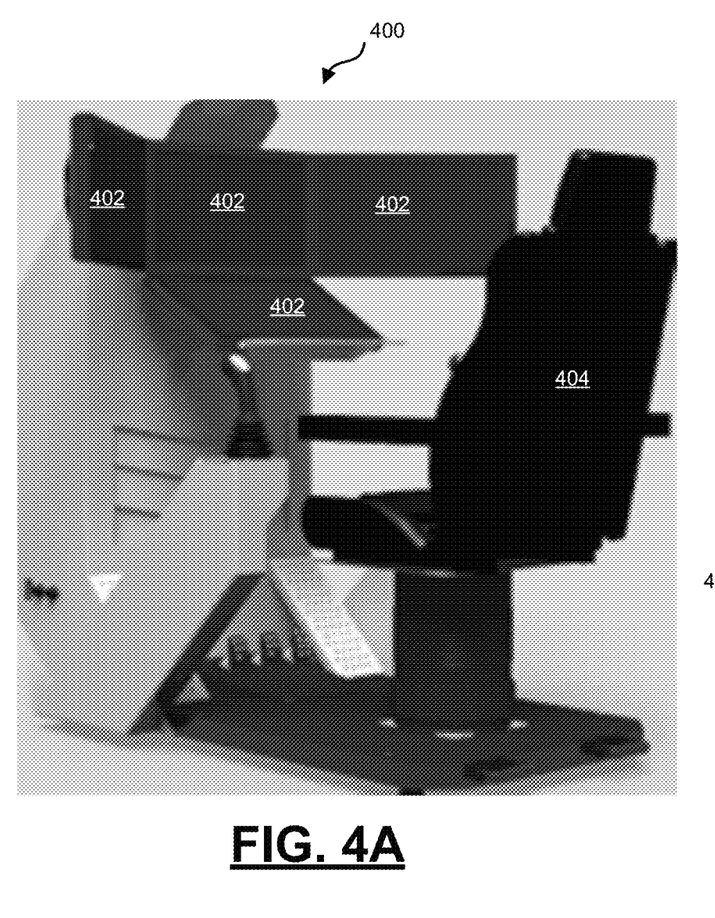
FIG. 4A is a diagram depicting an example operator interface, in accordance with various embodiments.

FIG. 4A is a diagram depicting an example operator interface 400. The example operator interface 400 includes a plurality of display units to display one or more AV fleet map graphics 302 and one or more user interfaces for controlling one or more AVs. The example operator interface 400 also includes a seating apparatus 402 with haptic sensors for providing haptic feedback to convey a sense of direction to an operator who uses the seating apparatus while controlling an AV. The example operator interface 400 may also include a directional speaker system (not shown) to convey a sense of direction to an operator who uses the example operator interface 400 while controlling an AV.

Figure 4B:
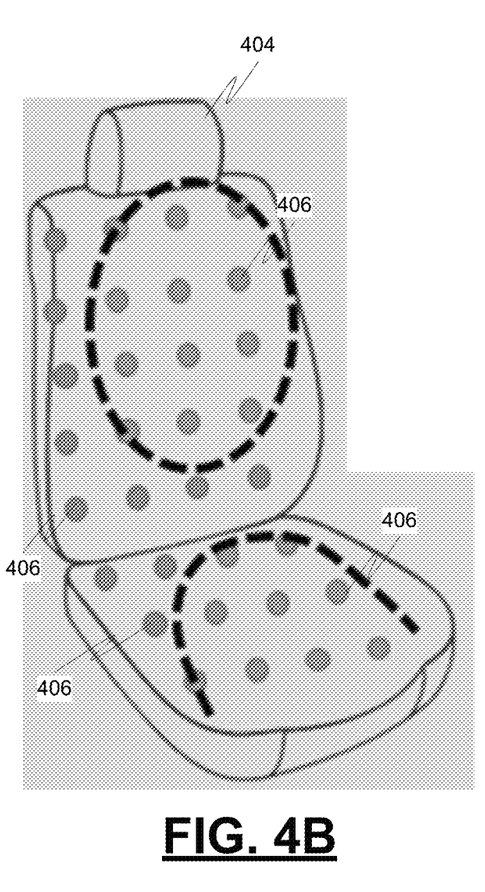
FIG. 4B is a diagram depicting example haptic sensors in the example seating apparatus, in accordance with various embodiments.

FIG. 4B is a diagram depicting example haptic sensors 406 in the example seating apparatus 404. The haptic sensors 406 can be controlled to provide haptic feedback to convey a sense of direction to an operator who uses the seating apparatus 404 while controlling an AV.

Figure 5:
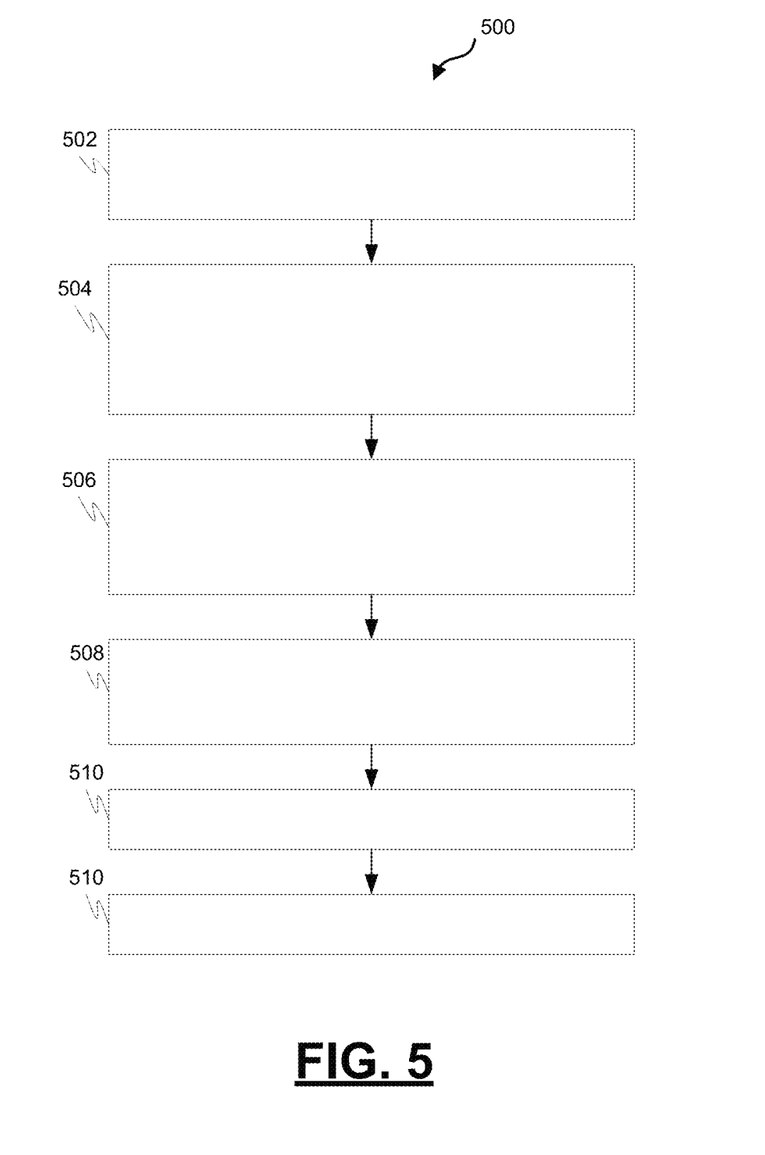
FIG. 5 is a process flow chart depicting an example process for generating an AV fleet map graphic for an operator situational awareness interface that provides a top down view of a geographical area and the location of AVs in a fleet of AVs that are located within the geographical area, in accordance with various embodiments.

FIG. 5 is a process flow chart depicting an example process 500 for generating an AV fleet map graphic for an operator situational awareness interface that provides a top down view of a geographical area and the location of AVs in a fleet of AVs that are located within the geographical area. The order of operation within process 500 is not limited to the sequential execution as illustrated in the FIG. 5 but may be performed in one or more varying orders as applicable and in accordance with the present disclosure.

The example process 500 includes generating a map of a geographical area of interest (operation 502), and obtaining location data and perceived risk data for a plurality of AVs in the geographical area (operation 504). The example process 500 includes generating a vehicle icon for each AV whose location data indicates that the AV is within the geographical area of interest (operation 506), and positioning the vehicle icons on the map based on the location data for the corresponding vehicle (operation 508).

The example process 500 includes applying a color coding to each vehicle icon based on a perceived risk for the corresponding vehicle (operation 510). Each vehicle icon is assigned a risk-level-specific color based on the perceived risk data for the corresponding vehicle. The example process 500 includes signaling a display device to display the AV fleet map graphic (operation 512).

Figure 6:
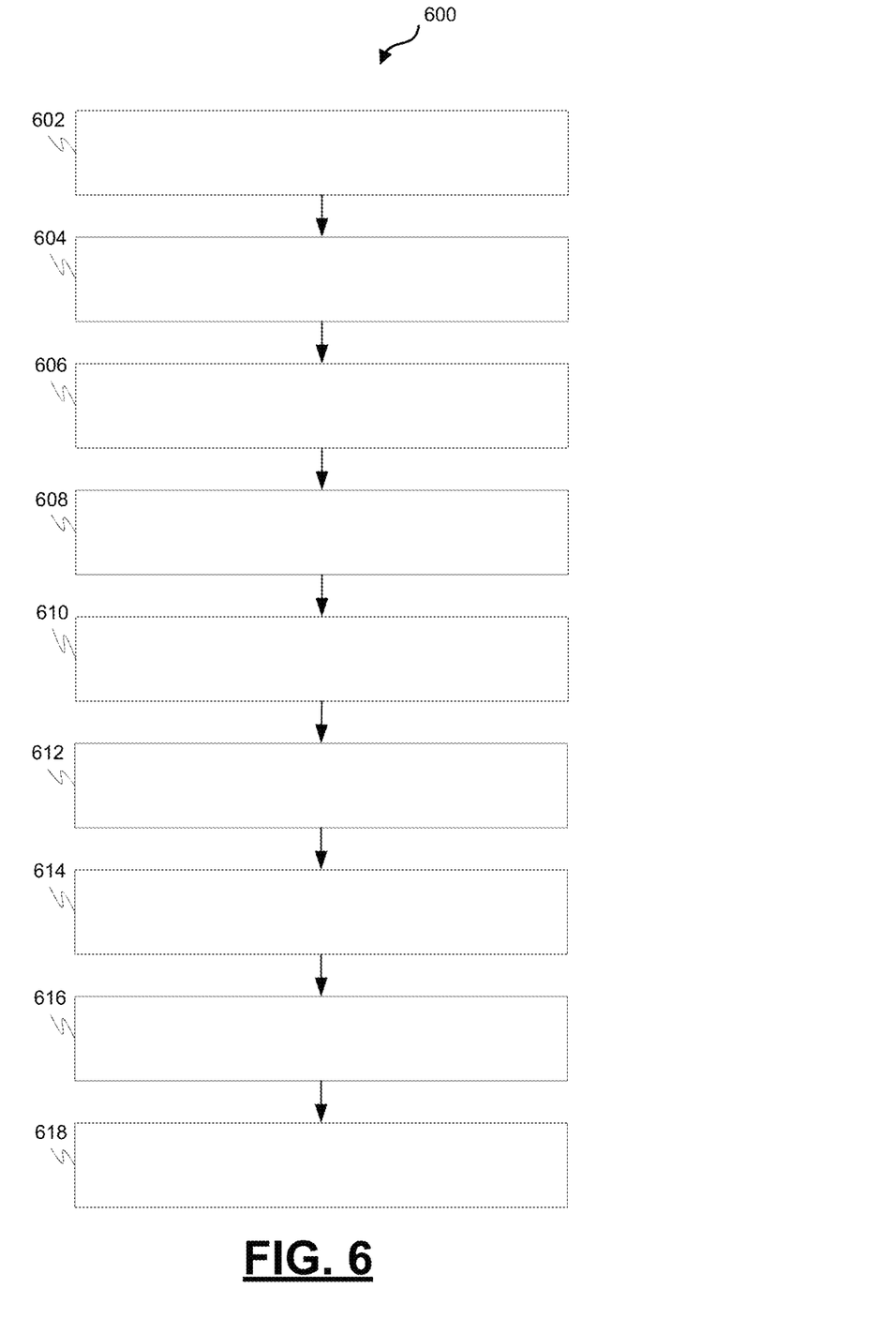
FIG. 6 is a process flow chart depicting an example process for generating an AV servicing queue graphic for an operator situational awareness interface that displays the AVs depicted in an AV fleet map graphic in an order based on a servicing priority determined by a supervisory control system, in accordance with various embodiments.

FIG. 6 is a process flow chart depicting an example process 600 for generating an AV servicing queue graphic for an operator situational awareness interface that displays the AVs depicted in an AV fleet map graphic in an order based on a servicing priority determined by a supervisory control system. The order of operation within process 600 is not limited to the sequential execution as illustrated in the FIG. 6 but may be performed in one or more varying orders as applicable and in accordance with the present disclosure.

The example process 600 includes generating and positioning a prioritization order graphical element that indicates a servicing priority order on an AV servicing queue graphic (operation 602). The example process 600 includes generating and positioning, on the AV servicing graphic, operator icons that are representative of operators who can assist with servicing the needs of the AVs (operation 604).

The example process 600 includes obtaining perceived risk data for the plurality of AVs in the fleet of AVs that are included in an AV fleet map graphic (operation 606). The perceived risk data may be obtained from a data integration module (e.g., data integration module 110).

The example process 600 includes determining a risk level for each of the plurality of AVs based on the perceived risk data (operation 608), identifying based on risk level the AVs in need of servicing assistance (operation 610), and determining a servicing assistance prioritization order for the AVs in need of servicing assistance based on the risk level of the AVs in need of servicing assistance (operation 612).

The example process 600 includes applying a color coding to each vehicle icon for the AVs in need of servicing assistance based on a perceived risk for the corresponding vehicle (operation 614). Each vehicle icon is assigned a risk-level-specific color based on the perceived risk data for the corresponding vehicle.

The example process 600 includes positioning the icons for the AVs in need of servicing assistance on the AV servicing queue graphic in the determined servicing assistance prioritization order (operation 616) and signaling a display device to display the AV servicing queue graphic (operation 618).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A supervisory control system for providing an operator situational awareness interface for a plurality of operators, the system comprising a controller configured to:
   generate a map of a geographical area of interest;
   obtain location data and perceived risk data for a plurality of automated vehicles (AVs) in the geographical area;
   generate a vehicle icon corresponding to each of the plurality of AVs;
   position the vehicle icon for each of the plurality of AVs on the map based on the location data for the corresponding AV;
   apply a color coding to each vehicle icon based on a perceived risk level for the corresponding AV;
   generate an AV servicing queue graphic that displays vehicle icons for the plurality of AVs in an order based on a determined servicing priority; and
   signal a display device to display an AV fleet map graphic that includes the map with color coded vehicle icons positioned thereon and the AV servicing queue graphic;
   wherein to generate the AV servicing queue graphic, the controller is further configured to:
      determine the perceived risk level for each of the plurality of AVs based on the perceived risk data;
      identify, based on the perceived risk levels, one or more AVs in need of servicing assistance from the plurality of AVs;
      determine a servicing assistance prioritization order for the one or more AVs in need of servicing assistance based on the perceived risk levels of the one or more AVs in need of servicing assistance;
      generate a second vehicle icon corresponding to each of the one or more AVs in need of servicing assistance;
      apply a second color coding to each second vehicle icon for the one or more AVs in need of servicing assistance based on a perceived risk for the corresponding AV; and
      position the second vehicle icon for the one or more AVs in need of servicing assistance on the AV servicing queue graphic in the determined servicing assistance prioritization order.

2. The system of claim 1, wherein to obtain location data and perceived risk data, the controller is configured to retrieve the location data and perceived risk data from a data integration module, wherein the data integration module is configured to accumulate the location data and perceived risk data from the plurality of AVs.

3. The system of claim 1, wherein the controller is further configured to assign a risk-level-specific color to each vehicle icon based on the perceived risk data for the corresponding AV.

4. The system of claim 1, wherein the controller is further configured to determine the perceived risk level for each of the plurality of AVs based on the perceived risk data.

5. The system of claim 1, wherein the controller is further configured to assign one of a plurality of predetermined perceived risk levels to each of the plurality of AVs based on the perceived risk data.

6. The system of claim 5, wherein the controller is further configured to assign a risk-level-specific color to each vehicle icon based on the perceived risk level assigned to the corresponding AV.

7. The system of claim 1, wherein the controller is further configured to:
generate and position a prioritization order graphical element that indicates a servicing priority order on the AV servicing queue graphic; and
generate and position, on the AV servicing queue graphic, a plurality of operator icons that are representative of operators who can assist with servicing the needs of the one or more AVs in need of servicing assistance.

8. The system of claim 7, wherein the controller is further configured to:
generate and position on the AV servicing queue graphic an operator assignment graphical element for use in identifying which of the one or more AVs in need of servicing assistance has been assigned to a particular operator; and
indicate the assignment of an AV to the particular operator by positioning the vehicle icon for the assigned AV on the operator assignment graphical element for the particular operator.

9. The system of claim 7, wherein the controller is further configured to:
generate and position on the AV servicing queue graphic a special servicing need graphical element for use in identifying AVs that have a special servicing need and to identify an operator who may be best suited to service the special servicing need;
generate and position on the AV servicing queue graphic a special operator assignment graphical element for use in identifying which of the AVs with a special servicing need has been assigned to the operator who is best suited to service the special servicing need; and
indicate the assignment of an AV with a special servicing need to the operator who is best suited to service the special servicing need by positioning the vehicle icon for the assigned special servicing need AV on the special operator assignment graphical element.

10. A method in a supervisory control system for providing an operator situational awareness interface for a plurality of operators, the method comprising:
generating a map of a geographical area of interest;
obtaining location data and perceived risk data for a plurality of automated vehicles (AVs) in the geographical area;
generating a vehicle icon corresponding to each of the plurality of AVs;
positioning the vehicle icon for each of the plurality of AVs on the map based on the location data for the corresponding AV;
applying a color coding to each vehicle icon based on a perceived risk level for the corresponding AV;
generating an AV servicing queue graphic that displays vehicle icons for the plurality of AVs in an order based on a determined servicing priority; and
signaling a display device to display an AV fleet map graphic that includes the map with color coded vehicle icons positioned thereon and the AV servicing queue graphic
wherein generating the AV servicing queue graphic comprises:
determining the perceived risk level for each of the plurality of AVs based on the perceived risk data;
identifying, based on the perceived risk levels, one or more AVs in need of servicing assistance;
determining a servicing assistance prioritization order for the one or more AVs in need of servicing assistance based on the perceived risk levels of the one or more AVs in need of servicing assistance;
generating a second vehicle icon corresponding to each of the one or more AVs in need of servicing assistance;
applying a second color coding to each second vehicle icon for the one or more AVs in need of servicing assistance based on a perceived risk for the corresponding AV; and
positioning the second vehicle icon for the one or more AVs in need of servicing assistance on the AV servicing queue graphic in the determined servicing assistance prioritization order.

11. The method of claim 10, further comprising assigning one of a plurality of predetermined perceived risk levels to each of the plurality of AVs based on the perceived risk data.

12. The method of claim 11, further comprising assigning a risk-level-specific color to each vehicle icon based on the perceived risk level assigned to the corresponding AV.

13. The method of claim 10, further comprising:
generating and positioning a prioritization order graphical element that indicates a servicing priority order on the AV servicing queue graphic; and
generating and positioning, on the AV servicing queue graphic, a plurality of operator icons that are representative of operators who can assist with servicing the needs of the one or more AVs in need of servicing assistance.

14. The method of claim 13, further comprising:
generating and positioning on the AV servicing queue graphic an operator assignment graphical element for use in identifying which of the AVs in need of servicing assistance has been assigned to a particular operator; and
indicating the assignment of an AV to the particular operator by positioning the vehicle icon for the assigned AV on the operator assignment graphical element for the particular operator.

15. The method of claim 13, further comprising:
generating and positioning on the AV servicing queue graphic a special servicing need graphical element for use in identifying AVs that have a special servicing need and to identify an operator who may be best suited to service the special servicing need;
generating and positioning on the AV servicing queue graphic a special operator assignment graphical element for use in identifying which of the AVs with a special servicing need has been assigned to the operator who is best suited to service the special servicing need; and
indicating the assignment of an AV with a special servicing need to the operator who is best suited to service the special servicing need by positioning the vehicle icon for the assigned special servicing need AV on the special operator assignment graphical element.

16. A supervisory control system for generating an AV servicing queue graphic for a plurality of operators, the supervisory control system comprising a controller configured to:

obtain perceived risk data for a plurality of automated vehicles (AVs);

determine a perceived risk level for each of the plurality of AVs based on the perceived risk data;

identify, based on the perceived risk levels, one or more AVs in need of servicing assistance;

determine a servicing assistance prioritization order for the one or more AVs in need of servicing assistance based on the perceived risk levels of the one or more AVs in need of servicing assistance;

generate a vehicle icon corresponding to each of the one or more AVs in need of servicing assistance;

apply a color coding to each vehicle icon for the one or more AVs in need of servicing assistance based on a perceived risk for the corresponding AV;

position the vehicle icons for the one or more AVs in need of servicing assistance on the AV servicing queue graphic in the determined servicing assistance prioritization order; and signal a display device to display the AV servicing queue graphic.

17. The supervisory control system of claim 16, wherein the controller is further configured to:

generate and position a prioritization order graphical element that indicates a servicing priority order on the AV servicing queue graphic; and generate and position, on the AV servicing queue graphic, a plurality of operator icons that are representative of operators who can assist with servicing the needs of the one or more AVs in need of servicing assistance.

18. The supervisory control system of claim 17, wherein the controller is further configured to:

generate and position on the AV servicing queue graphic an operator assignment graphical element for use in identifying which of the one or more AVs in need of servicing assistance has been assigned to a particular operator; and indicate the assignment of an AV to the particular operator by positioning the vehicle icon for the assigned AV on the operator assignment graphical element for the particular operator.

19. The supervisory control system of claim 17, wherein the controller is further configured to:

generate and position on the AV servicing queue graphic a special servicing need graphical element for use in identifying AVs that have a special servicing need and to identify an operator who may be best suited to service the special servicing need;

generate and position on the AV servicing queue graphic a special operator assignment graphical element for use in identifying which of the AVs with a special servicing need has been assigned to the operator who is best suited to service the special servicing need; and indicate the assignment of an AV with a special servicing need to the operator who is best suited to service the special servicing need by positioning the vehicle icon for the assigned special servicing need AV on the special operator assignment graphical element.

* * * * *